US012247604B1

(12) United States Patent
Dornik et al.

(10) Patent No.: US 12,247,604 B1
(45) Date of Patent: Mar. 11, 2025

(54) METHOD AND SYSTEM WITH ACCELERATION BASED FLOW DRILL SCREW CONTROL

(71) Applicant: Atlas Copco IAS GmbH, Bretten (DE)

(72) Inventors: Nicholas Dornik, Canton, MI (US); Garret Sankey Huff, Ann Arbor, MI (US); Amanda Kay Freis, Ann Arbor, MI (US)

(73) Assignee: Atlas Copco IAS GmbH, Bretten (DE)

( * ) Notice: Subject to any disclaimer, the term of this patent is extended or adjusted under 35 U.S.C. 154(b) by 0 days.

(21) Appl. No.: 18/466,775

(22) Filed: Sep. 13, 2023

(51) Int. Cl.
*B21J 15/02* (2006.01)
*F16B 25/10* (2006.01)

(52) U.S. Cl.
CPC .............. *F16B 25/10* (2013.01); *B21J 15/02* (2013.01); *B21J 15/027* (2013.01)

(58) Field of Classification Search
CPC . F16B 25/10; F16B 35/00; F16B 35/06; B21J 15/02; B21J 15/027
USPC .......................... 29/525.11, 407.01; 411/378
See application file for complete search history.

(56) References Cited

U.S. PATENT DOCUMENTS

| | | | |
|---|---|---|---|
| 9,901,974 | B2 | 2/2018 | Pfeiffer et al. |
| 10,406,592 | B2 * | 9/2019 | Blacket ................ B23K 26/352 |
| 10,981,213 | B2 | 4/2021 | Stützer et al. |
| 11,241,728 | B2 * | 2/2022 | Blacket ................ B23K 20/127 |
| 2011/0289752 | A1 * | 12/2011 | Werthwein ............ F16B 25/106 |
| | | | 411/386 |
| 2015/0209857 | A1 * | 7/2015 | Blacket ................ F16D 27/112 |
| | | | 228/2.1 |
| 2015/0328676 | A1 | 11/2015 | Zinn et al. |
| 2015/0328677 | A1 * | 11/2015 | Pfeiffer ................ F16B 25/106 |
| | | | 29/505 |
| 2018/0161850 | A1 * | 6/2018 | Gao ..................... B23K 20/1295 |
| 2018/0200780 | A1 | 7/2018 | Stutzer et al. |
| 2019/0210093 | A1 * | 7/2019 | Kohl ........................ B21J 15/02 |

(Continued)

FOREIGN PATENT DOCUMENTS

DE          10111979          9/2002

OTHER PUBLICATIONS

Sprovieri, Flow-Drilling Screws Help Carmakers Shed Weight, Assembly online magazine, Feb. 1, 2016, 8 pages, BNP Media, 2023.

(Continued)

*Primary Examiner* — Sarang Afzali
*Assistant Examiner* — Darrell C Ford
(74) *Attorney, Agent, or Firm* — WTA Patents

(57) ABSTRACT

A method of installing a flow drill screw (FDS) into a substrate includes engaging the FDS with an automatic tool, operating the tool at a first setting to drive the FDS into the substrate by causing flow of the substrate to permit the FDS to penetrate the substrate, and switching the automatic tool from the first setting to a second setting in response to a controller analyzing axial acceleration data of the FDS. The first setting is configured to rotate the FDS at a first rotational speed and to apply a first axial feed force. The first setting is further configured to cause flow of the substrate to permit the FDS to penetrate the substrate. The second setting is configured to rotate the FDS at a second rotational speed and to apply a second axial feed force. The second rotational speed is less than the first rotational speed.

9 Claims, 7 Drawing Sheets

(56) References Cited

U.S. PATENT DOCUMENTS

2020/0400183 A1 12/2020 Maiwald et al.
2022/0395893 A1 12/2022 Ludsteck et al.

OTHER PUBLICATIONS

Semblex, FDS Flow Drill Screw for High-Strength Sheet Joints, Product Pages, 8 pages.
International Search Report and Written Opinion of the corresponding PCT/EP2024/076511 mailed on Dec. 6, 2024.

* cited by examiner

METHOD AND SYSTEM WITH ACCELERATION BASED FLOW DRILL SCREW CONTROL

FIELD

The present disclosure relates to a method and system for installing a flow drill screw.

BACKGROUND

The statements in this section merely provide background information related to the present disclosure and may not constitute prior art.

A flow drill screw (FDS) is a specific type of screw that is used to generate a screw joint between a plurality of substrates, one of which being a lower substrate, without the use of part preparation like tapping a thread or punching a hole in the lower substrate. The lower substrate is typically metal and the total number of substrates is typically two to four, though other numbers can be used. The upper substrate(s) may or may not have a preformed thru-hole.

A typical FDS has a distal end portion that lacks threads or cutting edges and is configured to penetrate the substrate by locally heating the substrate with heat generated by rotational friction and axial pressure on the FDS. As the FDS penetrates the substrate, it forms threads in the substrate.

In a typical FDS process, an automatic tool is controlled to rotate the FDS at a high revolutions per minute (RPM) rate while applying a high axial force toward the substrate. The typical FDS automatic tool does not directly control axial position. This high RPM, high force generates the friction that heats the substrate and is maintained until the automatic tool detects a trigger condition, from real-time measured data, that corresponds to the beginning of penetration. Immediately upon detecting this trigger condition, the controller of the automatic tool signals the automatic tool to reduce the RPM and force. Thus, the automatic tool reduces the RPM and force before the thread forming portion of the FDS enters the substrate so that the thread forming and tightening of the FDS against the substrate can occur at a lower RPM and force. It is generally understood in the art that the RPM and force should be reduced as soon as penetration is achieved, but not before. It is generally accepted in the art that if the FDS has not fully penetrated prior to the step down in RPM and force, then there is a high chance that the FDS will ultimately not penetrate the lower substrate at all. This is due to the lower speed and/or force not generating sufficient heat or force to continue penetration and deformation of the metal. Additionally, it is generally believed by those in the art that it is important that the RPM and force are reduced before the thread forming portion enters the bottom substrate so that both there is sufficient process control as process completion nears (e.g., drive down and final tightening) and to allow the substrate to cool slightly before the thread forming portion enters the substrate and bushing region. It is also generally understood to be critical that the RPM and force are sufficiently low at the typical step down point of the process to have acceptable capability to stop the process upon reaching a target torque value, and not overshoot and strip the joint.

It is important that the torque applied to the FDS during the penetration portion of the installation process not rise above the rated torque value of the FDS.

The trigger condition is typically an axial position (i.e., depth) or an axial velocity (i.e., depth gradient) threshold value. While these typical trigger condition may work well for some applications, there exist room for improvement.

The teachings of the present disclosure address these and other issues with installing a FDS into a substrate.

SUMMARY

This section provides a general summary of the disclosure and is not a comprehensive disclosure of its full scope or all of its features.

In one form, the present disclosure provides for a method of installing a flow drill screw (FDS) into a substrate, the method including: engaging the FDS with an automatic tool; operating the automatic tool at a first setting to drive the FDS into the substrate by causing flow of the substrate to permit the FDS to penetrate the substrate, the first setting being configured to rotate the FDS at a first rotational speed and to apply a first axial feed force on the FDS, the first setting being configured to cause flow of the substrate to permit the FDS to penetrate the substrate; and switching the automatic tool from the first setting to a second setting in response to a controller determining analyzing axial acceleration data of the FDS, wherein the second setting is configured to rotate the FDS at a second rotational speed and to apply a second axial feed force to the FDS, wherein the second rotational speed is less than the first rotational speed.

According to a variety of alternative forms, that can be used with the method of the above paragraph individually or in any combination thereof: the method further includes detecting positional data of the FDS while operating the automatic tool at the first setting, and calculating the axial acceleration of the FDS based on the detected positional data; the method further includes applying a smoothing filter to the detected positional data to generate a set of smoothed positional data, wherein the axial acceleration is calculated using the set of smoothed positional data; the method further includes calculating axial velocity data from the detected positional data, and applying a smoothing filter to the calculated axial velocity data to generate a set of smoothed axial velocity data, wherein the axial acceleration is calculated using the set of smoothed axial velocity data; switching the automatic tool from the first setting to the second setting is performed in response to the controller determining that an axial acceleration of the FDS exceeds a predetermined axial acceleration value, the predetermined axial acceleration value is between 1,000 to 30,000 mm/s$^2$; the axial acceleration data is measured by an accelerometer; the method further includes positioning one or more additional substrates adjacent the substrate such that the FDS clamps the one or more additional substrates to the substrate after completion of the method; the first rotational speed is between 1,500 to 12,000 RPM, inclusive, and the first axial feed force is between 0.5 to 4 kN, inclusive, wherein the second rotational speed is between 500 to 4,000 RPM, inclusive, and the second axial feed force is between 0.25 to 1.25 KN, inclusive.

In a further form, the present disclosure provides for a method of installing a flow drill screw (FDS) into a substrate, the method including: engaging the FDS with an automatic tool; operating the automatic tool at a first setting to drive the FDS into the substrate by causing flow of the substrate to permit the FDS to penetrate the substrate, the first setting being configured to rotate the FDS at a first rotational speed and to apply a first axial feed force on the FDS, the first setting being configured to cause flow of the substrate to permit the FDS to penetrate the substrate; detecting positional data of the FDS while operating the automatic tool at the first setting; calculating axial acceleration data of the FDS based on the detected positional data; and switching the automatic tool from the first setting to a second setting based on an axial acceleration maximum or the axial acceleration data exceeding a predetermined axial acceleration value, wherein the second setting is configured to rotate the FDS at a second rotational speed and to apply a second axial feed force to the FDS, wherein the second rotational speed is less than the first rotational speed.

According to a variety of alternative forms, that can be used with the method of the above paragraph individually or in any combination thereof: the method further includes applying a smoothing filter to the detected positional data to generate a set of smoothed positional data, wherein the axial acceleration data is calculated using the set of smoothed positional data; the method further includes calculating axial velocity data from the detected positional data, applying a smoothing filter to the calculated axial velocity data to generate a set of smoothed axial velocity data, wherein the axial acceleration is calculated using the set of smoothed axial velocity data; switching the automatic tool from the first setting to the second setting is based on the axial acceleration data exceeding the predetermined axial acceleration value, wherein the predetermined axial acceleration value is between 500 to 50,000 mm/s$^2$; the method further includes positioning one or more additional substrates adjacent the substrate such that the FDS clamps the one or more additional substrates to the substrate after completion of the method; the first rotational speed is between 1,500 to 12,000 RPM, inclusive, and the first axial feed force is between 0.5 to 4 kN, inclusive, wherein the second rotational speed is between 500 to 4,000 RPM, inclusive, and the second axial feed force is between 0.25 to 1.25 kN, inclusive.

In still another form, the present disclosure provides for a system for installing a flow drill screw (FDS) including: a drive unit configured to rotate the FDS about an axis at a rotational speed while exerting an axial feed force on the FDS to drive the FDS through at least one substrate; and a controller configured to change the rotational speed and the axial feed force in response to a measured or calculated axial acceleration of the FDS exceeding a predetermined axial acceleration value.

According to a variety of alternative forms, that can be used with the system of the above paragraph individually or in any combination thereof: the system further includes a sensor configured to detect positional data of the FDS, wherein the controller is configured to calculate the axial acceleration of the FDS based on the detected positional data of the FDS; the controller is configured to apply a smoothing filter to the positional data to generate a set of smoothed positional data, wherein the axial acceleration is calculated using the set of smoothed positional data; the controller is configured to reduce the rotational speed and the axial feed force from a first rotational speed and axial feed force to a second rotational speed and a second axial feed force in response to the axial acceleration of the FDS exceeding the predetermined axial acceleration value; the first rotational speed is between 1,500 to 12,000 RPM, inclusive, and the first axial feed force is between 0.5 to 4 kN, inclusive, wherein the second rotational speed is between 500 to 4,000 RPM, inclusive, and the second axial feed force is between 0.25 to 1.25 KN, inclusive; the predetermined axial acceleration value is between 500 to 3,000 mm/s$^2$.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
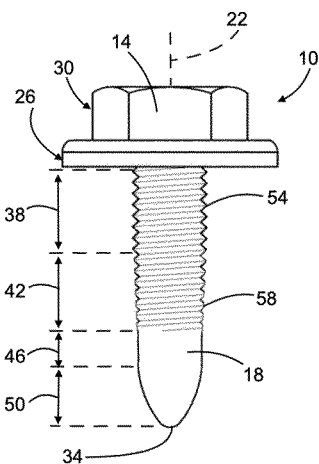
FIG. 1 is a side view of an example flow drill screw (FDS)

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a typical FDS 10 is shown and has a head 14 and a shank 18 disposed about a rotational axis 22. The head 14 includes a clamping portion 26 and a tool engagement portion 30. The clamping portion 26 extends radially outward from the shank 18. The tool engagement portion 30 is configured to be gripped by an automatic tool to rotate the FDS about its rotational axis 22. The shank 18 extends in an axial direction from the clamping portion 26 to a tip 34. Between the tip 34 and the clamping portion 26 is a threaded portion 38, a thread forming portion 42, a cylindrical portion 46 and an end portion 50. The tip 34 is typically rounded, relatively smooth, and relatively blunt, as shown, though some typical FDS's may have a more pointed tip. The end portion 50 includes the tip 34 and tapers radially outward to the cylindrical portion 46. The end portion 50 and the cylindrical portion 46 lack threads. In some forms, the cylindrical portion 46 has a constant diameter. In other forms, the cylindrical portion 46 has a diameter that increases more gradually than the end portion 50. The threaded portion 38 has at least one full threadform 54 disposed about the axis 22. The thread forming portion 42 is axially between the cylindrical portion 46 and the threaded portion 38 and has at least one partial threadform 58 that coincides with the at least one full threadform 54 but tapers radially inward from the full threadform 54 toward the cylindrical portion 46. In other words, the thread forming portion 42 has a partial-depth threadform that narrows in diameter (i.e., major diameter) with increased distance from the threaded portion 38. In some forms, not shown, a typical FDS may have a second cylindrical portion between the clamping portion 26 and the threaded portion 38.

Figure 2:
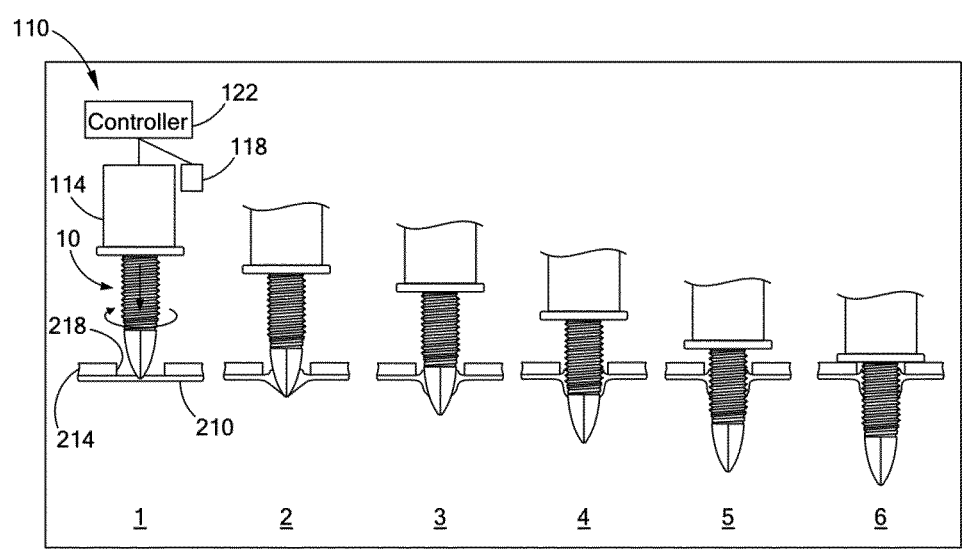
FIG. 2 is series of sequential phases of a FDS of FIG. 1 during an installation process according to the teachings of the present disclosure.

Referring to FIGS. 1 and 2, sequential phases or states (labelled 1-6) of the FDS 10 during an installation process by an installation tool 110 are shown. The tool 110 is an automatic tool that includes a driver 114, one or more sensors 118 (only shown in phase 1 for ease of illustration), and a controller 122 (only shown in phase 1 for ease of illustration). The driver 114 is configured to engage the tool engagement portion 30 of the FDS 10 to rotate the FDS 10 about its rotational axis 22 while applying an axial force toward a first substrate 210. The controller 122 is in communication with the driver 114 and the sensors 118 and configured to control operation of the driver 114 and receive input from the sensors 118.

The first substrate 210 can be any suitable material, formed using any suitable process. In one form, the first substrate 210 is aluminum or aluminum alloy. In another form, the first substrate 210 is magnesium or magnesium alloy. In yet another form, the first substrate 210 is steel or a steel alloy. In still another form, the first substrate 210 is a composite material. In some forms, the first substrate 210 can be a stamped sheet of material. In other forms, the first substrate 210 can be a casting. In still other forms, the first substrate 210 can be an extruded piece. In yet other forms, the first substrate may be forged.

While not specifically shown, the driver 114 includes a motor (e.g., electric motor, hydraulic motor, or pneumatic motor) configured to provide rotation and controlled by the controller 122. While not specifically shown, the driver 114 also includes an actuator, which may be actuated by any suitable power source (e.g., electric, hydraulic, or pneumatic power), to apply the axial force. The actuator is controlled by the controller 122. In one form, the actuator is a pneumatic actuator (e.g., pneumatic cylinder) to apply the axial force. In one form, the driver 114 may optionally be disposed a robotic arm (not shown) or pedestal (not shown) and the controller 122 can be configured to control movement of the robotic arm.

In the first phase, the FDS 10 is rotated while an axial force is applied on the FDS 10 in the axial direction toward the first substrate 210. In this first or initial phase, the first substrate 210 lacks any thru hole at the location where the FDS 10 is to be installed.

In the example provided, the first substrate 210 is a lower substrate and a second substrate 214 is an upper substrate disposed on top of the first substrate 210 and configured to be clamped to the first substrate 210 by the clamping portion 26 of the FDS 10. In the example provided, the second substrate 214 defines a pre-formed bore 218 that has a diameter greater than the shank 18 but less than the clamping portion 26 so that the clamping portion 26 can clamp the second substrate 214 against the first substrate 210. While only one second substrate 214 is illustrated, additional substrates can be used. For example, in some configurations, not specifically shown the FDS 10 may clamp one, two, three, four, or more additional substrates to the first substrate 210 in addition to the second substrate 214. These additional substrates may optionally have pre-formed thru-holes or the FDS may form the hole therethrough. In the example shown in FIG. 2, the FDS 10 penetrates entirely through the first substrate 210 in the final phase 6.

While the first substrate 210 is shown in FIG. 2 as being thinner than the second substrate 214, in another form, not specifically shown, the first substrate 210 may be thicker than the second substrate 214.

In another alternative configuration, not specifically shown, the first substrate 210 may be the top substrate and a second substrate may be the bottom substrate but without the pre-formed bore 218 (FIG. 2) of the second substrate 214. In this alternative configuration, the FDS 10 can drill through the first substrate 210 and through the second substrate to clamp the first substrate 210 to the second substrate.

In still another alternative configuration, not specifically shown, a second substrate can be entirely omitted and the FDS 10 can be connected only to the first substrate 210. In some such forms, the FDS 10 may include a connection feature (not shown, e.g., a hook, an eyelet, a magnet, surface for receiving adhesive, etc.) so that a mating feature on another component may be coupled to the FDS 10 after the FDS 10 is attached to the first substrate 210.

Returning to FIGS. 1 and 2, at the first phase 1, also referred to as the heating phase, the rotational speed and axial force of the tool 110 are configured to generate friction at the tip 34 to locally heat the substrate an amount sufficient to cause the substrate to melt or soften to a flowable state. In general, the tool 110 continues to rotate the FDS 10 and apply axial pressure thereto until the FDS 10 is fully tightened in the final (e.g., sixth) phase 6, also referred to as the tightening phase.

At phase 2, also referred to as the penetrating phase, the end portion 50 of the FDS 10 begins penetrating into the first substrate 210 but the cylindrical portion 46 has not entered into the first substrate 210. At phase 3, the cylindrical portion begins entering the first substrate 210 but the thread forming portion 42 has not entered into the first substrate 210. Phase 3 is also referred to as the hole forming phase as this is the phase at which the minor diameter of the bore is formed in the first substrate 210. It should be understood that, while phase 3 is shown with the tip 34 fully penetrated through the first substrate 210, the tip 34 may still be within the first substrate 210 depending on the thickness of the first substrate 210. At phase 4, the thread forming portion 42 begins penetrating into the first substrate 210 but the threaded portion 38 has not entered into the first substrate 210. Phase 4 is also referred to as the thread forming phase as the thread forming portion 42 develops the threads at this phase. At phase 5, the threaded portion 38 begins penetrating the first substrate 210. During phase 5, also referred to as the drive down phase, the threaded portion 38 threads into the threads formed by the thread forming portion 42 and progression of the FDS 10 proceeds axially into the first substrate 210 until the clamping portion 26 engages the second substrate 214 (or in the form where the second substrate is below the first substrate 210, the clamping portion 26 engages the first substrate 210) to begin the final phase 6. At phase 6, also referred to as the tightening phase or final tightening phase, the FDS 10 is tightened until fully tight.

In some forms, the sensors 118 can detect a predetermined end trigger condition and the controller 122 controls the driver 114 to tighten the FDS 10 until the predetermined end trigger condition. In one form, the sensors 118 can include a torque sensor and the end trigger condition may be a predetermined final torque value. The predetermined final torque value is less than a torsional strength rating of the FDS 10. In another form, sensors 118 can include a depth or position sensor to detect position data and the predetermined end trigger condition can be a depth or position of the FDS 10 and/or a pre-determined torque value.

Figure 3:
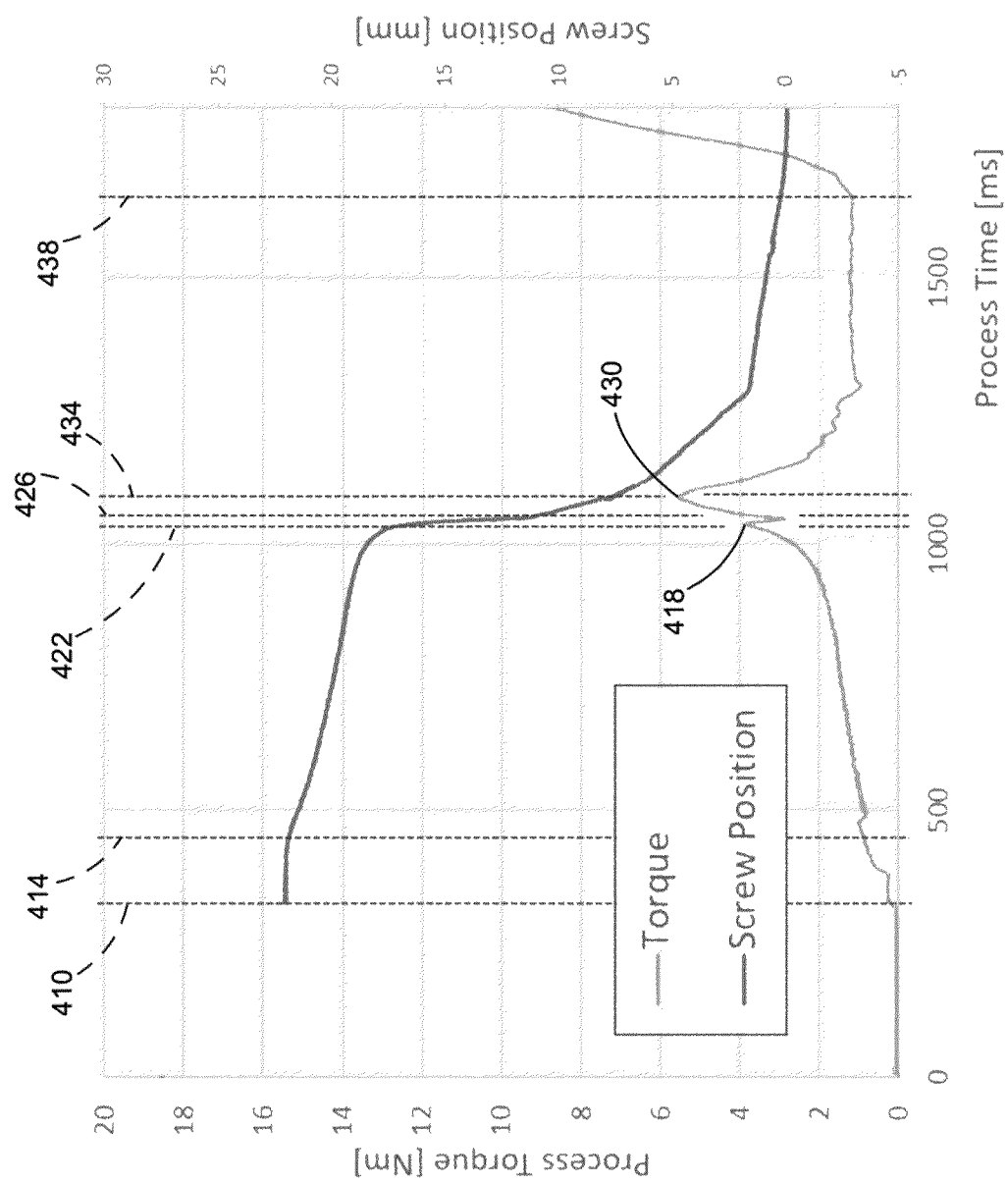
FIG. 3 is a graph illustrating torque and screw position for an installation process of a flow drill screw according to the teachings of the present disclosure.

Referring to FIG. 3, torque and screw axial position (i.e., depth) are illustrated over time during an installation process of a FDS 10. In this graph, the maximum screw position (i.e., at line 410) refers to the position at which the tip 34 of the FDS 10 initially contacts the first substrate 210 and the screw position of 0 mm (zero mm) refers to the final position wherein the clamping portion 26 clamps the second substrate 214 against the first substrate 210 (or in the form where the second substrate is below the first substrate 210, the clamping portion 26 engages the first substrate 210).

Referring to FIGS. 2 and 3, phase 1 (i.e., the heating phase) begins at line 410 and proceeds to line 414. During this phase, the torque rises but the axial position of the FDS 10 remains stationary as heat builds up.

Phase 2 (i.e., the penetrating phase) begins at line 414. During this phase, the torque continues to rise to a first peak 418 and the axial position of the FDS 10 progresses slowly downward (i.e., toward zero mm) as the tip 34 begins penetrating the first substrate 210. As shown, the axial position of the FDS 10 may begin to slowly move downward while the tip 34 continues to penetrate the first substrate 210 due to the first substrate 210 continuing to soften due to the buildup of heat.

Phase 3 (i.e., the hole forming phase) begins at line 422. During this phase, the torque drops and the axial position of the FDS 10 moves quickly downward as the cylindrical portion 46 enters the first substrate 210.

Phase 4 (i.e., the thread forming phase) begins at line 426. During this phase, the torque rises quickly to a second peak 430 and the axial position of the FDS 10 continues downward, though at a slower rate than during phase 3, as the thread forming portion 42 enters the first substrate 210 and forms threads in the first substrate 210.

Phase 5 (i.e., the drive down phase) begins at line 434. During this phase, the torque decreases to a generally steady state as the axial position of the FDS 10 continues downward via mating action of the threaded portion 38 and the threads formed in the first substrate 210 by the thread forming portion 42 during phase 4.

Phase 6 (i.e., the final tightening phase) begins at line 438. During this phase, the torque rises steeply while the axial position of the FDS 10 remains substantially at zero mm. The torque rises until the end trigger condition is met and the controller 122 stops rotation of the driver 114.

At the start of phase 1 (line 410), the tool 110 is controlled to operate at a first setting in which the tool 110 is controlled to operate at a first rotational speed and first axial feed force. At some point between the start of phase 3 (line 422) and the start of phase 6 (line 438), the tool 110 is controlled to switch from the first setting to a second setting, in which the tool 110 is controlled to operate at a second RPM and a second axial feed force (which may optionally be the same as or different than the first axial feed force). The first rotational speed is also referred to herein as a high rotational speed and can be in the range of 1,500 to 11,000 RPM, inclusive. In one form, the first rotational speed is more specifically in the range of 2,000 to 8,000 RPM, inclusive. In another form, the first rotational speed is more specifically in the range of 6,000 to 11,000 RPM, inclusive. The first axial feed force is also referred to herein as a high axial feed force and is in the range of between 0.5 to 2.5 kilonewtons (kN), inclusive. In one form, the first axial feed force may be in the range of between 1 to 2 kN. The second rotational speed is also referred to herein as a low rotational speed and is in the range of 500 to 4,000 RPM, inclusive. In one form, the second rotational speed can be within this range but is less than the first rotational speed, though other configurations can be used. The second axial feed force is also referred to herein as a low axial feed force and is in the range of 0.25 to 1.25 KN, inclusive. In one form, the second axial feed force can be within this range but is less than the first axial feed force, though other configurations can be used. For example, in another form, the second axial feed force may be equal to or greater than the first axial feed force.

Figure 4:
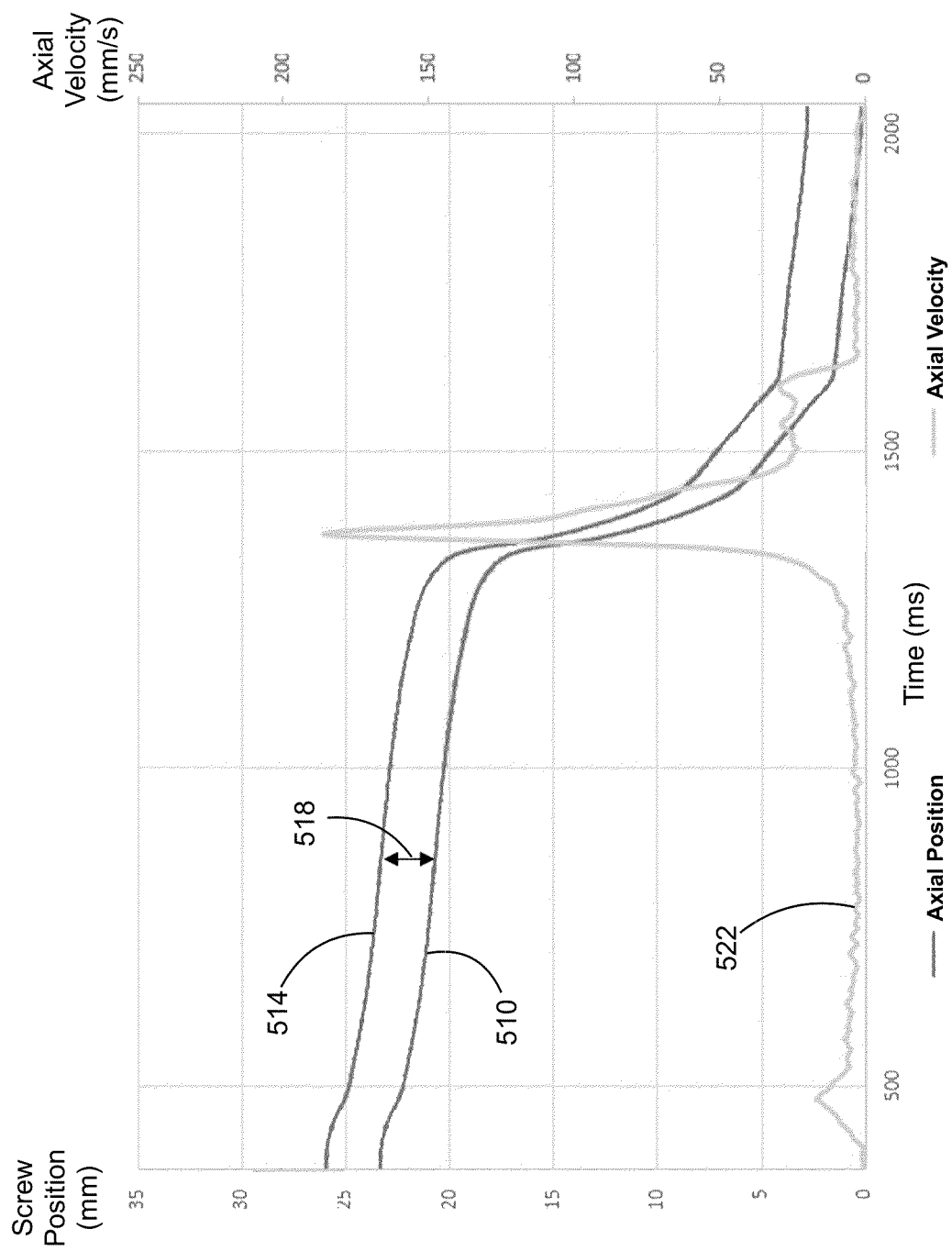
FIG. 4 is a graph illustrating axial velocity, screw position, and an erroneous screw position measurement for an installation process of a flow drill screw according to the teachings of the present disclosure.

Referring to FIG. 4, two sets of data for screw axial position (i.e., depth) of the same screw is illustrated over time during an installation process of the FDS 10. A first position curve 510 is formed by a first set of screw position data measured by the sensors 118. A second position curve 514 is formed by a second set of screw position data measured by the sensors 118. The difference 518 in measured screw position data can be due to any number of factors (e.g., errors in the calibration between two position sensors 118).

FIG. 4 also illustrates the axial velocity 522 of the FDS 10 over time during the installation process. As shown in FIG. 4, the axial velocity 522 is the same for both position curves 510, 514. It has been found that the axial velocity is effectively the same or has very little difference even if the two position curves are produced using the same sensor 118 but for the same general process with subsequent screw (e.g., where the difference 518 in measured position data is due to other factors such as dimensional tolerances in the FDS 10, tolerances in the first substrate 210, and/or tolerances in the second substrate 214).

Figure 5:
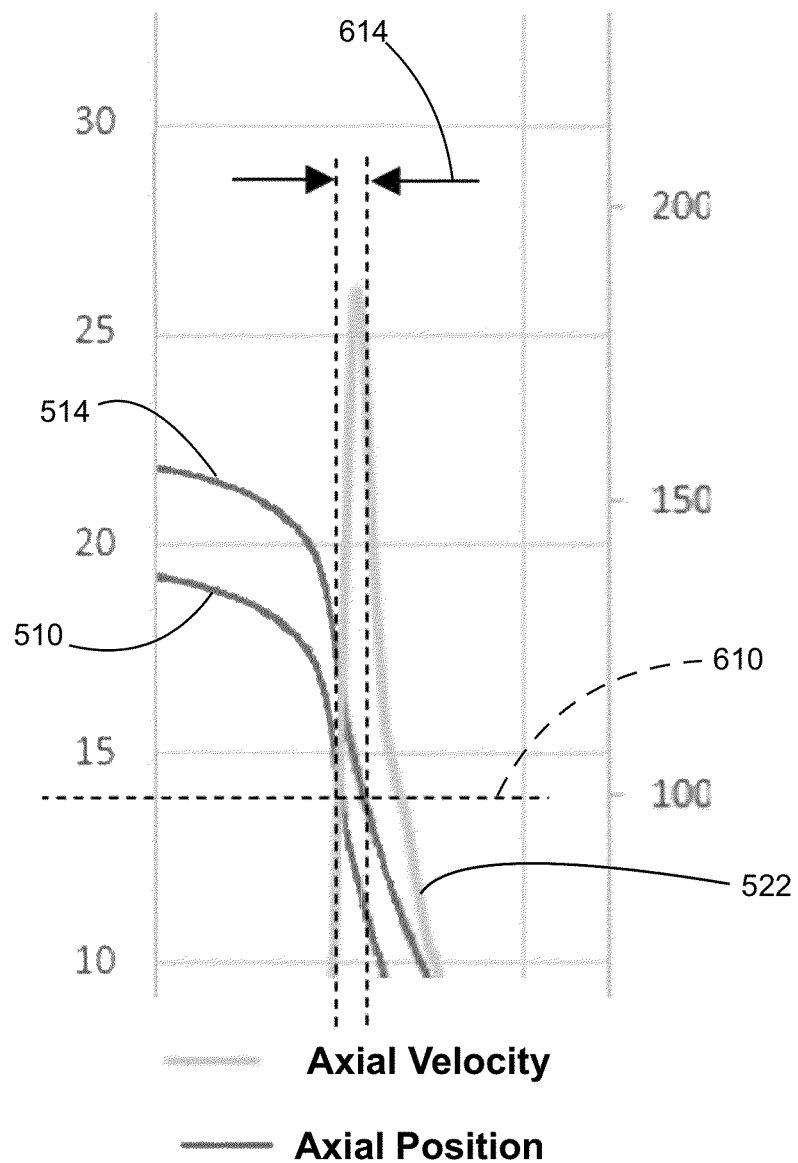
FIG. 5 is a detailed view of a portion of the graph of FIG. 4, illustrating how axial velocity control can correct for erroneous screw position measurements.

Referring to FIG. 5, when a specific axial position (e.g., depth) value is used as the trigger point (e.g., threshold 610) to switch from the first setting (e.g., high rotational speed and high axial feed force) to the second setting (e.g., low rotational speed and low axial feed force), an error (shown by distance 614 between the time when the first position data 510 crosses that value 610 and when the second position data 514 crosses that value 610 can be created. However, if the threshold 610 is a specific axial velocity value, instead of an axial position value, then it has been found to eliminate (as in the example shown) or greatly reduce this error, while ensuring the process can function as intended.

However, it has been found that, due to many factors (e.g., signal propagation times, signal processing times, sampling speed, rotational momentum in the system), these typical trigger conditions (e.g., position threshold or axial velocity threshold) can end up being a lagging indicator of the true position of the FDS 10. In other words, by the time the actual rotation and axial force of the FDS 10 is reduced (compared to the time when the controller sends the signal(s) to reduce the rotation and axial force), the FDS 10 may already be beyond the most desirable axial position relative to the substrate(s).

Figure 6:
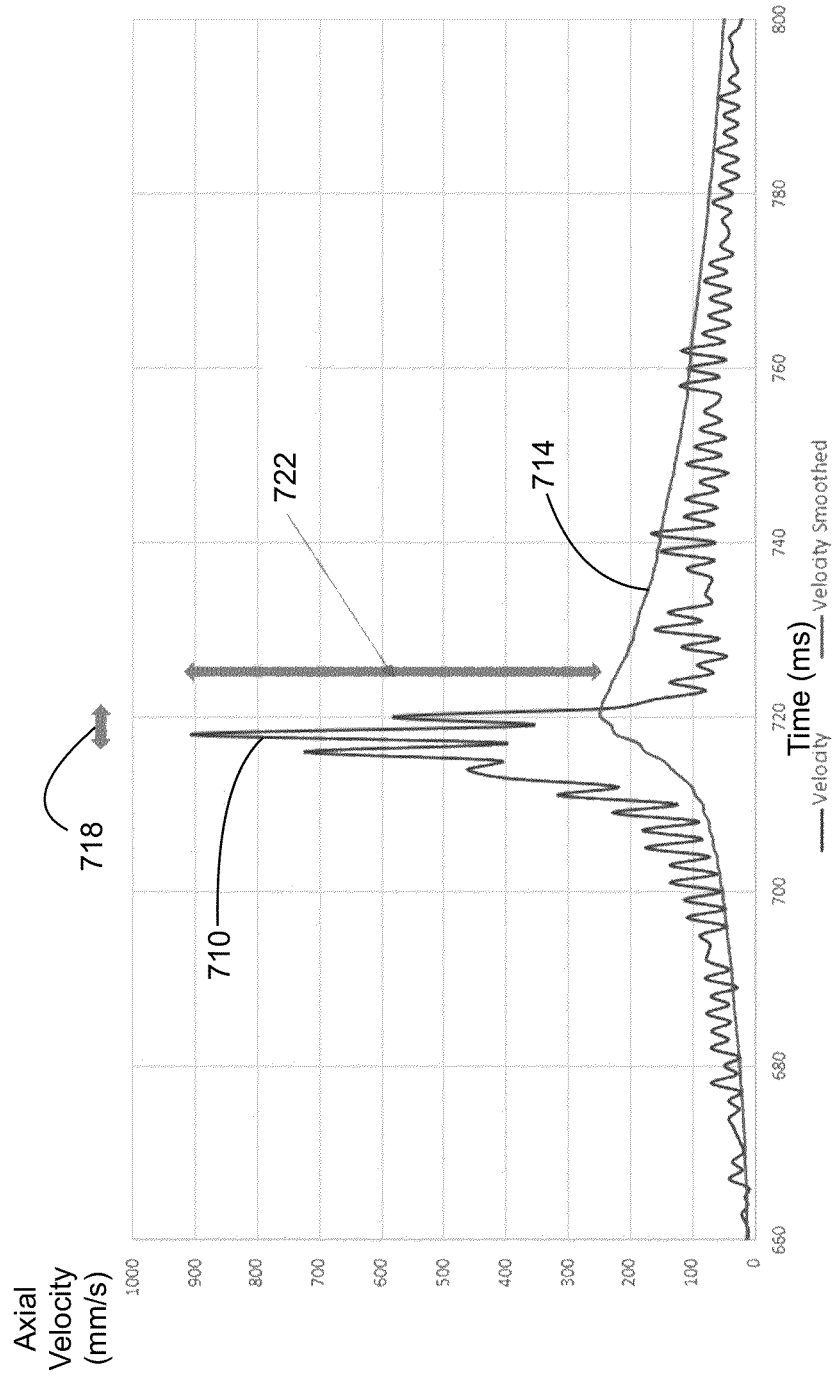
FIG. 6 is a graph illustrating screw velocity plots for an installation process of a flow drill screw according to the teachings of the present disclosure, showing a magnitude of error between velocity calculated by taking real-time derivatives of screw position measurements and smoothed velocity data generated by smoothing the calculated real-time derivatives.

Referring to FIG. 6, real-time velocity (i.e., depth gradient) data 710 of an FDS 10 over time during the installation process is illustrated along with real-time smoothed axial velocity data 714. As used herein, "velocity" is referring to axial velocity". The velocity data 710 is calculated in real-time by the controller 122 by taking the first derivative of the axial position data (e.g., axial position curves 510 or 514) detected by the sensor 118. The controller 122 may calculate the velocity data 710 using the measured axial position data in raw form or in a smoothed form (i.e., after applying a smoothing filter to the measured axial position data; any suitable smoothing filter may be used such as those discussed below). As can be seen from the relatively jagged (i.e., noisy) plot of the velocity data 710, the sensitivity, sampling rate, and tolerances of the position sensor 118, as well as other noise inducing interference, can result in a data set with a lot of variability between adjacent values in time. This variability can also make it difficult to set an axial velocity threshold trigger value that will repeatably trigger at the same actual position of the FDS 10 relative to the substrates 210, 214.

The smoothed velocity data 714 is calculated in real-time by the controller 122 by passing the velocity data 710 through a smoothing filter. The smoothing filter may be any suitable smoothing filter. Some non-limiting examples of smoothing filters are moving average, local regression, exponential smoothing, Kalmann and Savitzky-Golay smoothing filters.

As can be seen in FIG. 6, this smoothed velocity data 714 ends up both magnitude and phase/time shifted relative to the velocity data 710. Some of this shift may also be due to the processing times in terms of calculating these values in real-time. Furthermore, when the rate of change of the velocity data 710 is rapid, as is the case with FDS installation, a time error 718 and a magnitude error 722 between the velocity data 710 and the smoothed velocity data 714 can be significant. The time error also results in velocity threshold being even more of a lagging indicator of actual characteristics (e.g., actual axial position) of the FDS 10.

Figure 7:
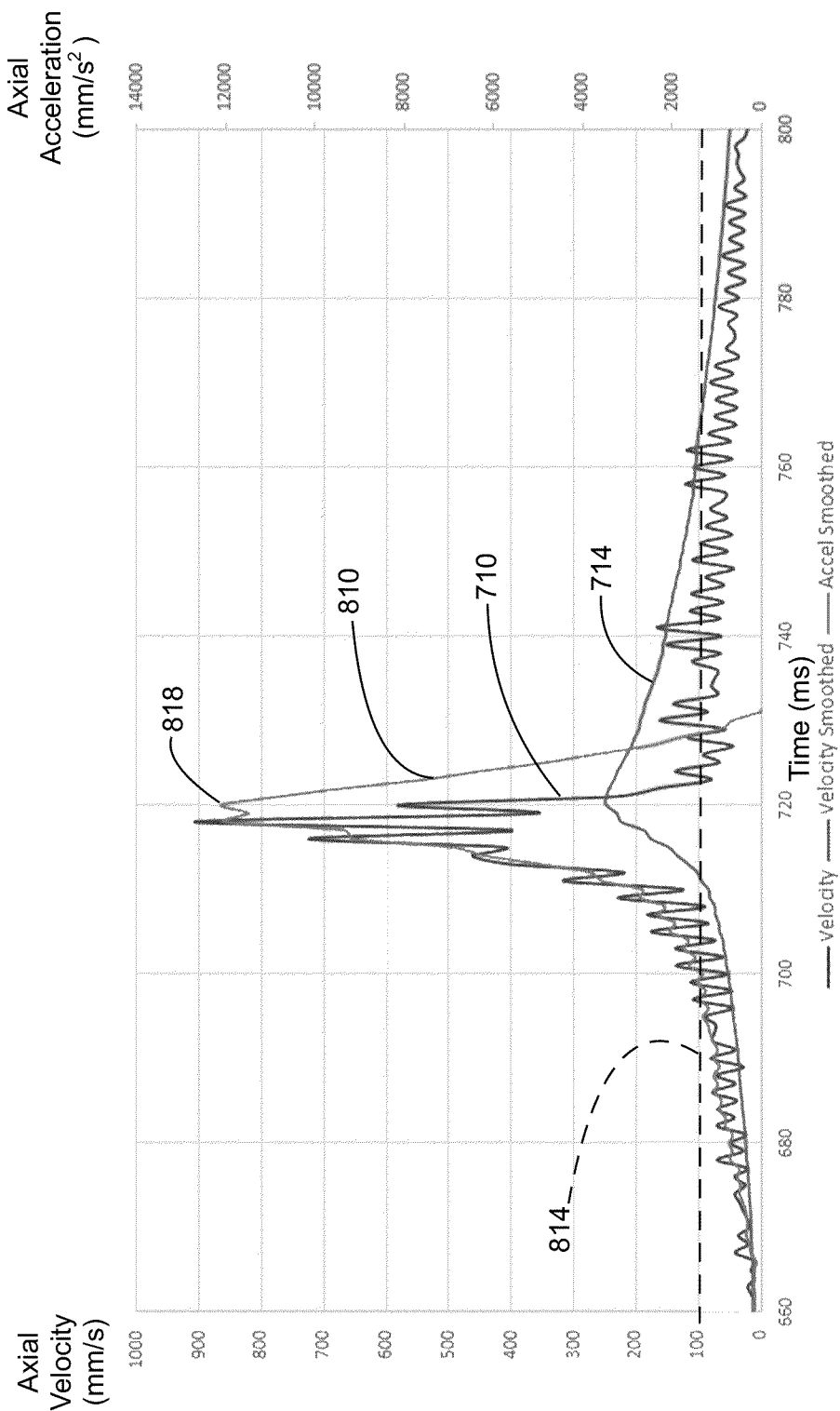
FIG. 7 is a graph similar to FIG. 6 but also illustrating acceleration of the screw, calculated by taking the derivatives of the smoothed velocity data according to the teachings of the present disclosure.

Referring to FIG. 7, the controller 122 is configured to calculate, in real-time, an axial acceleration data set 810 by taking the derivative of the smoothed velocity data 714. In other words, the acceleration data 810 is based on the second derivative of the positional data detected by the sensor 118. In another form, the controller 122 can directly calculate the second derivative of the measured position data, without first applying the smoothing filter to the velocity data 710 and/or to the position data, and may optionally apply a smoothing filter to this calculated second derivative data set to arrive at an acceleration data set for use in determining the trigger condition.

In yet another form, the sensor 118 may be an accelerometer and the measured data may directly be acceleration which may optionally be passed through a smoothing filter.

Surprisingly, it has been found that using the screw axial acceleration data (e.g., acceleration data set 810) and checking when it reaches a threshold acceleration value (e.g., trigger value 814), can be more precise and repeatable than using threshold axial position or axial velocity values while also providing a leading indicator. In other words, this screw acceleration data 810 provides a curve that can repeatably produce an identifiable threshold trigger that occurs early enough in the installation process that the controller 122 can act on this threshold so that the delays in data processing, signal propagation, physical momentum of components can be compensated for. In other words, setting the trigger to be the screw acceleration threshold value results in a much earlier trigger for the controller 122 to send control signals such that the FDS 10 actually physically achieves the second rotational speed and the second axial feed force sooner than would normally be possible with axial position or axial velocity value thresholds. The value of the trigger value at line 814 is shown in FIG. 7 for explanation purposes and may be chosen at other acceleration values than that shown. The actual acceleration threshold value may also be different due to the data collection and smoothing processes implemented. For example, different data collection and/or smoothing processes can change the values of the data set being used and the threshold value can be chosen accordingly. Likewise, the values of the data plots or curves shown in the graphs of the figures are also shown for explanation purposes and may be different depending on the data collection and/or smoothing processes used.

In one form, the screw acceleration threshold value 814 can be between 50 to 300 $mm/s^2$, inclusive, though other ranges can be used (e.g., such as 1,000 to 30,000 $mm/s^2$, inclusive, or 500 to 50,000 $mm/s^2$, inclusive, or 500 to 30,000 $mm/s^2$, inclusive) depending on the data collection and/or smoothing processes used. In one configuration of this form, the controller 122 sends control signals to switch to the second setting immediately upon determining that the screw axial acceleration data 810 has reached or exceeded the screw acceleration threshold value 814. In another configuration of this form, the controller 122 starts a predetermined time delay immediately upon determining that the screw axial acceleration data 810 has reached or exceeded the screw acceleration threshold value 814 and then sends control signals to switch to the second setting immediately upon the end of the time delay. In some forms, this time delay may be between 1 and 30 ms, inclusive. In still another configuration of this form, the controller 122 does not use a predetermined time delay and, instead, uses a predetermined axial positional delay. In other words, the controller 122 starts analyzing the measured axial position data immediately upon determining that the screw axial acceleration data 810 has reached or exceeded the screw acceleration threshold value 814 and then sends control signals to switch to the second setting immediately upon the axial position data showing that the FDS 10 has moved a predetermined axial distance after the threshold value 814. In some forms, this predetermined axial distance may be between 0.5 and 10 mm, inclusive.

In another form, not specifically shown, the screw acceleration threshold value 814 may be set to be the maximum axial acceleration achieved (e.g., at point 818 of FIG. 7) or can be set based on a determination of the maximum axial acceleration. In other words, the controller 122 may be configured to switch to the second setting upon determining that the maximum axial acceleration has been achieved. In one configuration of this form, the controller 122 may switch immediately upon determining that the maximum axial acceleration has been achieved. In another configuration, the controller 122 may be configured to switch immediately after a predetermined time delay after the maximum is determined. In another configuration, the controller 122 may be configured to switch immediately after a predetermined axial positional delay after the maximum is determined. The controller 122 can determine the maximum axial acceleration in any suitable manner, including but not limited to any of the following examples individually or in any suitable combination thereof. In example, the controller 122 compares each acceleration value to subsequent acceleration values and determines that the maximum value is the value that has at least two subsequent acceleration values below it. In another example, the controller 122 takes the derivative of the acceleration data values in real-time and determines that the maximum axial acceleration is the value at which the derivative (i.e., slope) of the acceleration curve 810 starts going negative. In another example, the controller 122 may fit a mathematical model (e.g., moving average) to the acceleration data and predict when the acceleration will reach the maximum. In the example where the controller 122 predicts the maximum acceleration, the controller 122 may switch to the second setting a predetermined time before that maximum so that the delays in signal processing, momentum, etc. are compensated for.

In still another form, not specifically shown, the screw acceleration threshold 814 may be set based on when the axial acceleration reaches zero (i.e., where it starts being negative such that the axial velocity is slowing down). In this form, the controller 122 may determine that the axial acceleration value has reached or passed zero and become negative and switches to the second setting immediately thereupon. In another example of this form, the controller 122 may fit a mathematical model (e.g., moving average) to the acceleration data and predict when the acceleration will reach zero. In the example where the controller 122 predicts the zero acceleration, the controller 122 may switch to the second setting a predetermined time before that zero value so that the delays in signal processing, momentum, etc. are compensated for.

Figure 8:
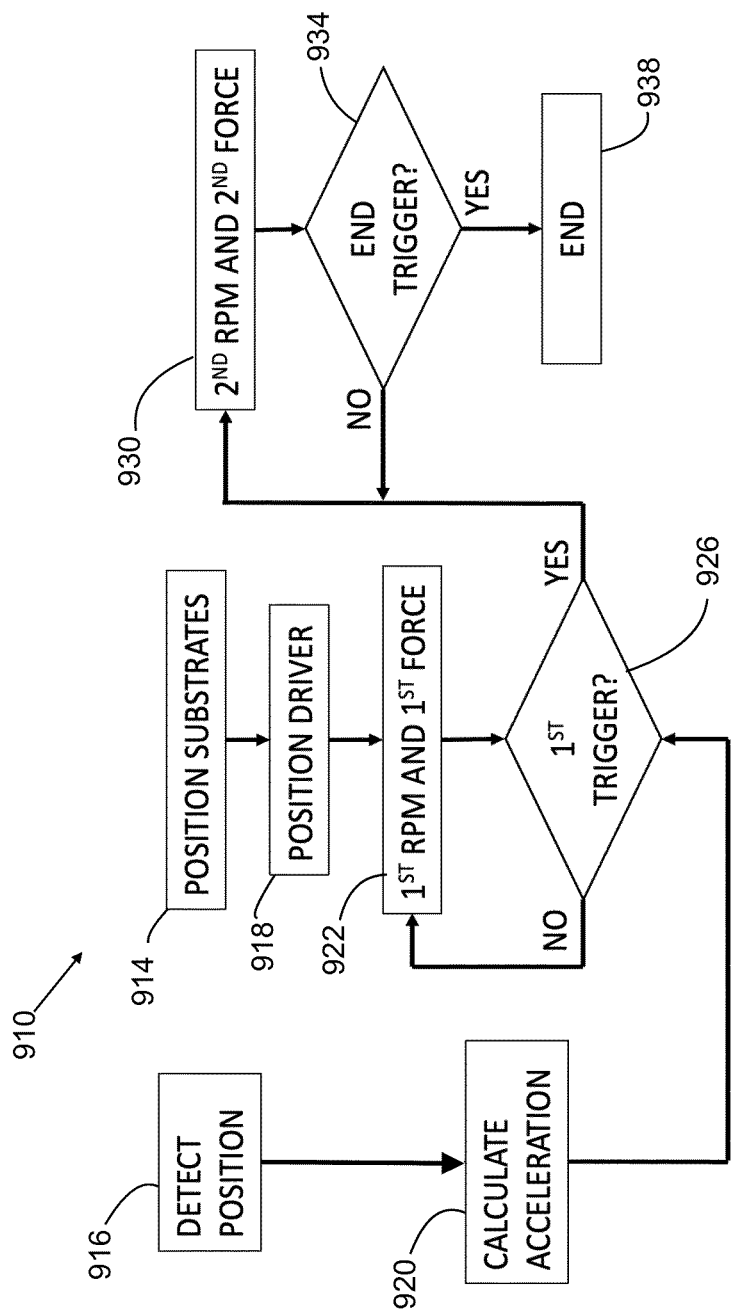
FIG. 8 is a flow chart illustrating a method of installing a flow drill screw according to the teachings of the present disclosure.

Referring to FIG. 8 an installation process or method 910 is illustrated. The installation method 910 includes step 914. At step 914, the substrate or substrates (e.g., the first substrate 210 and the second substrate 214) are positioned. The method 910 then proceeds to step 918.

At step 918, the controller 122 positions the driver 114 to be engaged with the FDS 10 and so that the tip 34 of the FDS 10 contacts the first substrate 210 at a predetermined location on the first substrate 210. The method 910 then proceeds to step 922.

The beginning of step 922 corresponds to line 410 (FIG. 4). At step 422, the controller 122 operates the automatic tool 110 at a first setting. For the first setting, the controller 122 controls the driver 114 to rotate at the first rotational speed and to apply the first axial force on the FDS 10. In other words, the controller 122 sends signals to the driver 114 to cause the driver 114 to rotate the FDS 10 at the first rotational speed while pressing the FDS 10 against the first substrate 210 with a first axial feed force.

While minor fluctuations may occur, the control signals from the controller 122 for the first setting are configured to operate the driver at a constant rotational speed and axial feed force during step 922.

As shown by step 916, while the driver 114 is applying the first rotational speed and the first axial feed force, the sensor(s) 118 detect a depth or position of the FDS 10. The controller 122 receives signals from the sensor(s) 118.

At step 920, the controller 122 calculates the acceleration data (e.g., acceleration data 810) as discussed above. In an alternative form, not specifically shown, step 916 may include directly detecting acceleration of the FDS 10 via an accelerometer type sensor and step 920 may involve the controller receiving that data and optionally applying a smoothing filter to that directly detected acceleration data.

Returning to the example provided, at step 926, the controller 122 determines, based on the acceleration data from step 920, if a predetermined first trigger condition is met. The first trigger condition of the method 910 is a threshold acceleration value of the FDS 10, such as threshold value 814 (FIG. 7) and/or those otherwise discussed above.

The controller 122 continues operating the driver 114 at the first rotational speed and the first axial feed force until the first trigger condition is met. The detection of the first trigger condition is configured to be such that the FDS 10 will achieve the start of phase 3 at line 422 (FIG. 3) and compensate for the delays in data processing, signal propagation, physical momentum of components as discussed above. When the first trigger condition is met, the method 910 proceeds immediately and directly to step 930.

At step 930, the controller 122 operates the automatic tool 110 at a second setting. At the second setting, the controller 122 sends a signal to the driver 114 to immediately begin operating the driver 114 at a second rotational speed and a second axial feed force.

While minor fluctuations may occur, the control signals from the controller 122 for the second setting are configured to operate the driver at a constant rotational speed and axial feed force during step 930.

While the driver 114 is applying the second rotational speed and the second axial feed force, the sensor(s) 118 may continue to detect the depth (i.e., position) of the FDS 10. The sensor(s) 118 may also detect torque values. The controller 122 continues to receive signals from the sensor(s) 118.

At step 934, the controller 122 determines, based on signals from the sensor(s) 118 if a predetermined end trigger condition is met. The end trigger condition may be a final torque value. The controller 122 continues operating the driver 114 at the second rotational speed and the second axial force until the end trigger condition is met. Once the end trigger condition is met, the controller 122 stops the rotation and axial force of the driver 114 to end the method, as indicated by step 938. It is understood that additional steps may be taken upon reaching step 938 and to say that the specific method discussed ends is not to require that the driver 114 and/or controller 122 must stop operating in all capacity at this point. For example, industry standard processes for torque control to tighten up the joint may be used.

In another form, the device and methods described herein can also be combined with the teachings of U.S. application Ser. No. 18/365,660, filed Aug. 4, 2023, the entire disclosure of which is incorporated herein by reference. For example, the screw acceleration threshold of the present disclosure may be used as the first trigger condition described in U.S. application Ser. No. 18/365,660 instead of the axial velocity (i.e., depth gradient) described therein.

Thus, this method and system described herein compensate for variations in sensors, screw geometry, substrate geometry, and other manufacturing factors such as gaps from part fit-up and compliance in the assemblies and fixtures.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of installing a flow drill screw (FDS) into a substrate, the method comprising:
    engaging the FDS with an automatic tool;
    operating the automatic tool at a first setting to drive the FDS into the substrate by causing flow of the substrate to permit the FDS to penetrate the substrate, the first setting being configured to rotate the FDS at a first rotational speed and to apply a first axial feed force on the FDS, the first setting being configured to cause flow of the substrate to permit the FDS to penetrate the substrate;
    determining axial acceleration data; and
    switching the automatic tool from the first setting to a second setting in response to a controller analyzing the axial acceleration data and determining whether a predetermined threshold acceleration value of the FDS has been met, wherein the second setting is configured to rotate the FDS at a second rotational speed and to apply a second axial feed force to the FDS, wherein the second rotational speed is less than the first rotational speed.

2. The method according to claim 1, further comprising:
    detecting positional data of the FDS while operating the automatic tool at the first setting; and
    calculating the axial acceleration data of the FDS based on the detected positional data.

3. The method according to claim 2, further comprising:
    applying a smoothing filter to the detected positional data to generate a set of smoothed positional data, wherein the axial acceleration data is calculated using the set of smoothed positional data.

4. The method according to claim 2, further comprising:
    calculating axial velocity data from the detected positional data;
    applying a smoothing filter to the calculated axial velocity data to generate a set of smoothed axial velocity data, wherein the axial acceleration data is calculated using the set of smoothed axial velocity data.

5. The method according to claim 2, wherein the switching the automatic tool from the first setting to a second setting in response to a controller analyzing axial acceleration data of the FDS includes switching the automatic tool from the first setting to a second setting based on an axial acceleration maximum or the axial acceleration data exceeding a predetermined axial acceleration value, wherein the axial acceleration maximum is based on the axial acceleration data.

6. The method according to claim 1, wherein switching the automatic tool from the first setting to the second setting is performed in response to the controller determining that an axial acceleration of the FDS exceeds the predetermined threshold acceleration value, the predetermined threshold acceleration value is between 1,000 to 30,000 mm/s$^2$.

7. The method according to claim 1, wherein the axial acceleration data is measured by an accelerometer.

8. The method according to claim 1, further comprising positioning one or more additional substrates adjacent the substrate such that the FDS clamps the one or more additional substrates to the substrate.

9. The method according to claim 1, wherein the first rotational speed is between 1,500 to 12,000 RPM, inclusive, and the first axial feed force is between 0.5 to 4 kN, inclusive, wherein the second rotational speed is between 500 to 4,000 RPM, inclusive, and the second axial feed force is between 0.25 to 1.25 KN, inclusive.

* * * * *